US012612208B2

(12) United States Patent
Caltabiano et al.

(10) Patent No.: US 12,612,208 B2
(45) Date of Patent: Apr. 28, 2026

(54) LINEAR MOTOR SYSTEM, CORRESPONDING FORMING ASSEMBLY AND METHOD

(71) Applicant: TETRA LAVAL HOLDINGS & FINANCE S.A., Pully (CH)

(72) Inventors: Daniele Caltabiano, Woodside, CA (US); Stefano Flore, Bologna (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 152 days.

(21) Appl. No.: 18/398,788

(22) Filed: Dec. 28, 2023

(65) Prior Publication Data

US 2024/0124179 A1 Apr. 18, 2024

Related U.S. Application Data

(63) Continuation of application No. PCT/EP2022/069229, filed on Jul. 11, 2022.

(30) Foreign Application Priority Data

Aug. 5, 2021 (EP) .................................... 21189787

(51) Int. Cl.
| | |
|---|---|
| *B65B 65/00* | (2006.01) |
| *H02K 29/08* | (2006.01) |
| *H02K 41/02* | (2006.01) |

(52) U.S. Cl.
CPC ............. *B65B 65/00* (2013.01); *H02K 29/08* (2013.01); *H02K 41/02* (2013.01)

(58) Field of Classification Search
CPC ........ B65B 65/00; H02K 41/02; H02K 29/08; H02K 41/031; H02K 29/06
See application file for complete search history.

(56) References Cited

U.S. PATENT DOCUMENTS 3,858,519 A * 1/1975 Masino ................... B65B 35/24
                                                  198/465.1
5,001,891 A * 3/1991 Abate ................. B29C 66/8491
                                                  53/551
(Continued)

FOREIGN PATENT DOCUMENTS

EP        2865602 A1     4/2015
EP        3501880 A1     6/2019
(Continued)

OTHER PUBLICATIONS

U.S. Appl. No. 18/574,803, filed Dec. 28, 2023, Daniele Caltabiano.
(Continued)

*Primary Examiner* — Thai T Dinh
(74) *Attorney, Agent, or Firm* — BUCHANAN INGERSOLL & ROONEY PC

(57) ABSTRACT

A linear motor system includes a track and at least one movable member coupled to the track and configured to move along the track. The at least one movable member includes a first element, a second element relatively movable with respect to the first element, and at least one movement detector configured to transmit a movement signal, wherein the movement detector comprises at least one magnet positioned at one of the first or second element, and at least one magnetometer positioned at the other of the first or the second element. The linear motor system also includes a processing unit configured to calculate a movement of the second element with respect to the first element as a function of the movement signal received from the movement detector.

17 Claims, 5 Drawing Sheets

(56) References Cited

U.S. PATENT DOCUMENTS

| 10,442,637 | B2 * | 10/2019 | Huang | B65G 43/00 |
|---|---|---|---|---|
| 10,661,924 | B2 * | 5/2020 | Andreotti | B65B 51/303 |
| 10,994,873 | B2 * | 5/2021 | Fontanazzi | B29C 66/82263 |
| 12,037,155 | B2 * | 7/2024 | Ackerman | B31B 70/645 |
| 2015/0344233 | A1 * | 12/2015 | Kleinikkink | G05B 19/4185 |
| | | | | 700/230 |
| 2019/0084781 | A1 * | 3/2019 | Huang | B60L 13/03 |
| 2020/0153315 | A1 | 5/2020 | Grosskreuz et al. | |
| 2020/0346795 | A1 * | 11/2020 | Fontanazzi | B29C 66/4312 |
| 2022/0085700 | A1 | 3/2022 | Grosskreuz et al. | |

FOREIGN PATENT DOCUMENTS

| EP | 3653552 A1 | 5/2020 |
|---|---|---|
| WO | 2019086307 A1 | 5/2019 |

OTHER PUBLICATIONS

U.S. Appl. No. 18/574,822, filed Dec. 28, 2023, Daniele Caltabiano.
U.S. Appl. No. 18/398,888, filed Dec. 28, 2023, Daniele Caltabiano.
International Search Report (PCT/ISA/210) and Written Opinion (PCT/ISA/237) mailed on Nov. 14, 2022 by the European Patent Office as the International Searching Authority for International Application No. PCT/EP2022/069229. (14 pages).
U.S. Appl. No. 18/574,803, filed Dec. 28, 2023, entitled "A Method of Monitoring the Condition of a Movable Member in a Linear Motor System, Corresponding Linear Motor System, Forming Assembly and Computer Program Product" and naming Daniele Caltabiano as inventor.
U.S. Appl. No. 18/574,822, filed Dec. 28, 2023, entitled "A Linear Motor System, Corresponding Forming Assembly and Method" and naming Daniele Caltabiano as inventor.
U.S. Appl. No. 18/398,888, filed Dec. 28, 2023, entitled "Linear Motor System, Corresponding Forming Assembly and Method" and naming Daniele Caltabiano as inventor.

* cited by examiner

FIG 3
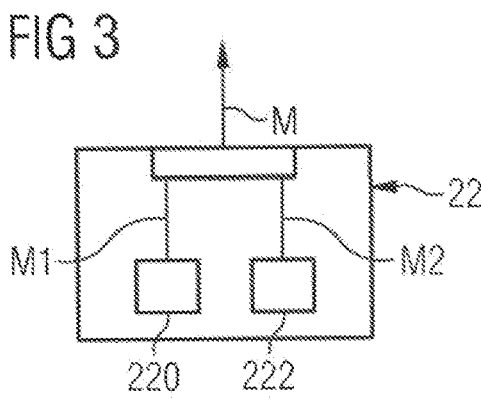
FIG 4
FIG 5
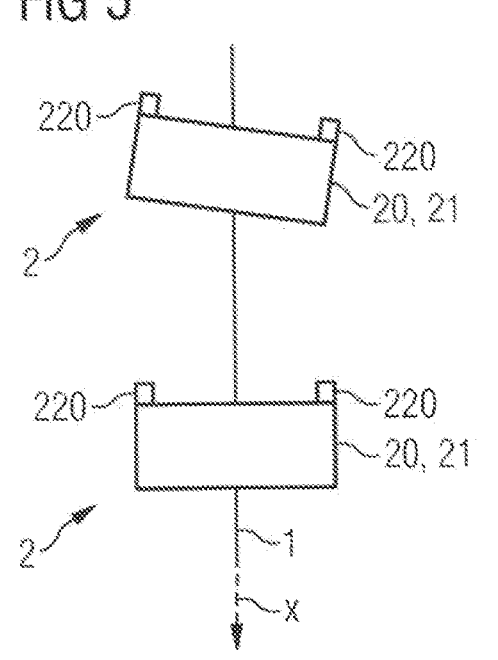

FIG 6
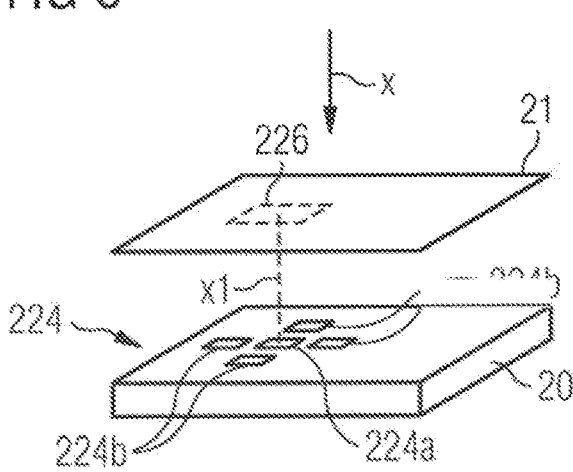
FIG 7
FIG 8
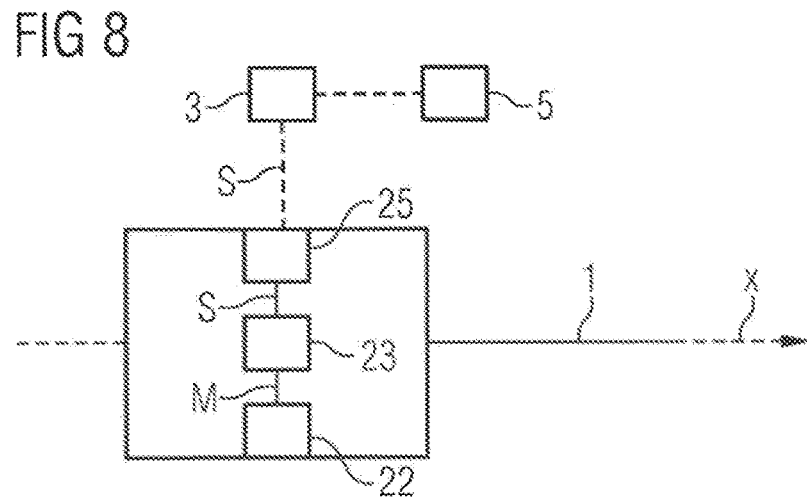

LINEAR MOTOR SYSTEM, CORRESPONDING FORMING ASSEMBLY AND METHOD

TECHNICAL FIELD

The present invention relates to linear motor systems comprising one or more tracks and movable members coupled thereto. The linear motor system according to the instant invention may be used in industrial applications, e.g. in a forming assembly for forming a plurality of objects such as a packaging assembly configured to form and seal a plurality of packs containing pourable products, in particular pourable food products.

BACKGROUND ART

Linear motor systems are known and used in industrial applications to improve efficiency and flexibility. Such linear motor systems comprise a plurality of movable members movable, independently from each other, on one or more tracks. For example, the linear motor system comprises independent carts movable along a racetrack.

For example, it is known the use of forming assemblies such as packaging assemblies comprising a plurality of movable members movable independently from each other on tracks and configured to form and/or seal objects such as packages made of sterilized packaging material configured to receive pourable food products, such as fruit juice, UHT (ultra-high temperature-treated) milk, wine, tomato sauce, etc.

These packages are normally produced in fully automatic packaging assemblies, in which a continuous tube is formed from a web of packaging material fed to such packaging assembly. To obtain the final package, the web is folded and sealed longitudinally to form the tube, which is fed along a vertical advancing direction. The tube is then filled with the sterilized food product from above and is sealed and subsequently cut along equally spaced transversal cross sections.

Although being functionally valid, the known linear motor systems are still open to further improvement. A need is felt for an improved (optionally continuous) movement (e.g. position) control of parts of the movable members and/or of the movable members along the track which may improve the correct operation of the linear motor system.

Like every mechanical system, all the components are affected by mechanical plays that, during the time, can decrease the overall stiffness and therefore the repeatability of the whole system. Accordingly, in a forming assembly, a movement control of each movable member and/or of the moving parts thereof may facilitate correct handling, i.e. forming and sealing, of the packages and/or detection of premature degradation of performance, e.g. for allowing a machine operator to take corrective actions before a forming error or an issue on sterility occurs. For example, processing units within the movable members of the system may not have a precise position control and the measures detected from sensors placed on the movable members may thus be imprecise.

A need is felt for a (continuous) position control of movable parts of the movable member, e.g. of those parts relatively movable to each other.

SUMMARY OF THE INVENTION

It is therefore an object of the present invention to provide a linear motor system, which can facilitate achieving one or more of the above-mentioned needs in a straightforward and low-cost manner. Such an object is achieved by means of a linear motor system and a corresponding method having the features set forth in the claims that follow.

Such an object may be achieved by means of a forming assembly for forming one or more objects, e.g. a packaging assembly for forming and sealing a plurality of packs, the forming assembly comprising a linear motor system according to one or more embodiments.

The disclosed embodiments may achieve one or more advantages, e.g.:

the movements of relatively movable parts of the movable members can be (precisely) monitored in real-time, the position control may facilitate reducing handling of defective products, a correct coupling between the movable members and the track can be monitored, faults or damages in the mechanical moving parts, e.g. due to play gained over time or stuck components, can be detected in an early phase, errors in the relative positioning of the movable members may be detected, and/or it is possible to measure and monitor key operations of the movable members, e.g. forming and sealing in case of a packaging assembly, directly on the movable members.

BRIEF DESCRIPTION OF THE DRAWINGS

Embodiments of the present invention will be described by way of example with reference to the accompanying drawings, in which:

FIG. 3 is a schematic illustration of details of a movement detector according to one or more embodiments, FIG. 4 exemplified a flow chart of a method of calculating a position according to one or more embodiments, FIGS. 5 and 6 exemplify details of a linear motor system according to one or more embodiments, FIG. 7 exemplifies sensitivity functions of magnetometers according to one or more embodiments, FIG. 8 is a schematic illustration of a detail of a linear motor system according to one or more embodiments, and FIG. 9 exemplifies a schematic front view, with parts removed for clarity, of a packaging assembly for forming a plurality of sealed packs according to the present invention.

DESCRIPTION OF THE INVENTION

Figure 1:
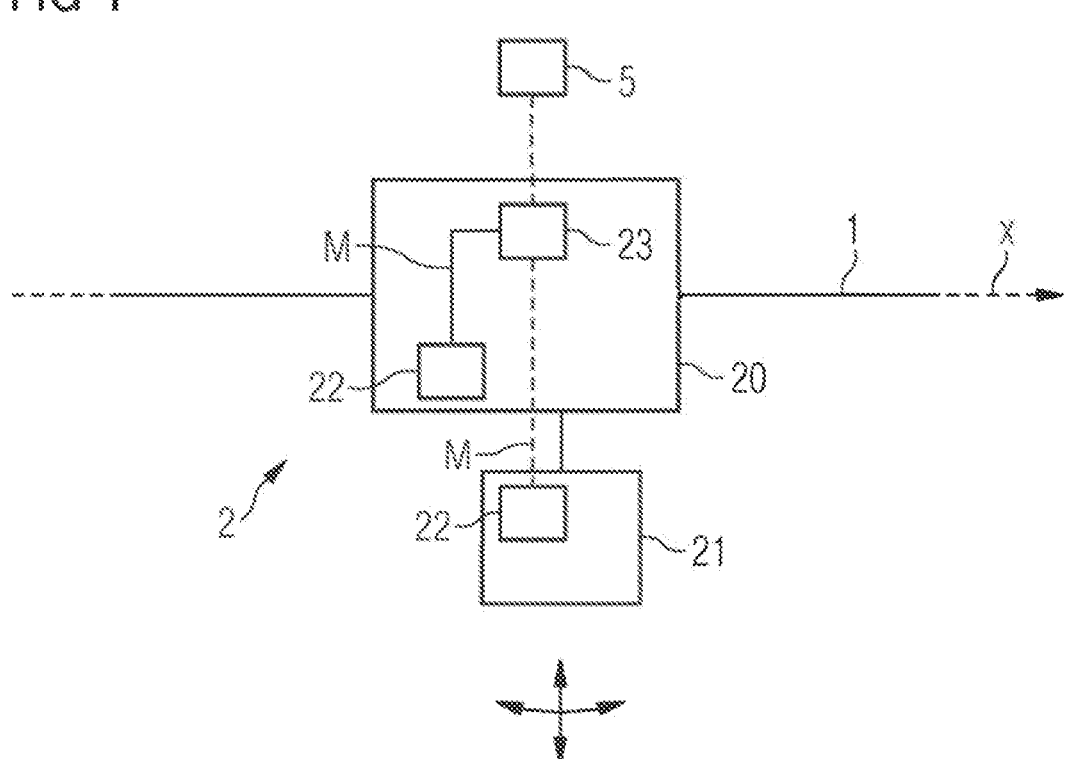
FIG. 1 is a schematic illustration of a detail of a linear motor system according to one or more embodiments.

FIG. 1 illustrates an example of a linear motor system according to one or more embodiments. Permanent magnets arrangements and coils—i.e. movable members and a respective track—define such type of linear motors, which, in a known manner, are configured to independently control the movement of the movable members along the respective track. The track may comprise a single rail or a plurality of rails. The rails can be closed in a racetrack configuration or they may be open.

The linear motor system comprises one or more tracks 1, e.g. a single track for simplicity in FIG. 1, and one or more movable members 2, preferably movers or carts, coupled to the track 1 and configured to move along the respective track 1, in FIG. 1 in a direction X exemplified by the arrow. For example, the track 1 defines an endless path on which the movable members 2 are configured to move cyclically.

Each movable member 2 comprises:

a first element 20, e.g. a body of the movable member 2, a second element 21, as better described in the following with reference to FIG. 2, relatively movable with respect to the first element 20, one or more movement detectors 22, e.g. mounted on the movable member 2, configured to transmit, e.g. wirelessly, a movement signal M indicative of movement of the movable member 2, the first element 20 and/or the second element 21.

The linear motor system further comprises a processing unit, e.g. a processing unit 23 of the movable member 2 or a system control and processing unit 5, the processing unit 5, 23 configured to calculate a movement of the first and/or second element 20, 21, e.g. calculate a position of the second element 21 with respect to the first element 20 as a function of the movement signal M received from the movement detector 22 and optionally a predetermined initial position.

The processing unit 5, 23 may be configured to interrupt operation of the movable members 2 and/or transmit an alert signal to a user interface, if the calculated position (of the movable member 2, the first element 20 and/or the second element 21) and/or vibration pattern differ from a predetermined position and/or predetermined vibration pattern, respectively. The predetermined position and/or predetermined vibration pattern may be indicative of operation of a healthy movable member 2.

The processing unit 23 of the movable member 2 may be configured to receive the movement signal M from the one or more movement detectors 22, e.g. in a cabled way or wirelessly. The processing unit 23 of the movable member 2 may be coupled wirelessly to the system control and/or processing unit 5, which may be positioned at the track 1. For example, the processing unit 23 may be configured to transmit data to the system control and/or processing unit 5 at each cycle, when the respective movable member 2 passes thereat. The transmission of data between the movable members 2 and the system control and/or processing unit 5 may occur by means of (e.g. low-energy) wireless transmission modules, e.g. Bluetooth low-energy transmission modules. The processing unit 5 and/or 23 may thus be configured to:

monitor a movement of the relatively movable members of the movable members, and/or identify, e.g. at an early stage, faults or errors as a function of the calculated position and/or velocity and/or acceleration.

If a fault or error is identified, the processing unit 5, 23 may be configured to:

generate the alarm signal, e.g. indicative of the detected error, and/or interrupt operation of the movable members 2.

Thus, the linear motor system may comprise a user interface configured to show the alarm signal.

The user can decide on which parts of the movable members 2 may be monitored, based e.g. on the relevance of the position control thereof or on the possibility that such parts may become faulty and lead to errors in the linear motor system operation flow.

In industrial applications, the movable members 2 are configured to perform certain automatized operations, such as grabbing, cutting, forming etc. To perform the operation correctly, it is desirable that the position of parts of the movable members 2 is monitored. This is possible thanks to the movement detectors 22 which are configured to detect a movement of the movable members 2 and/or parts thereof with respect to a known initial position.

Figure 2:
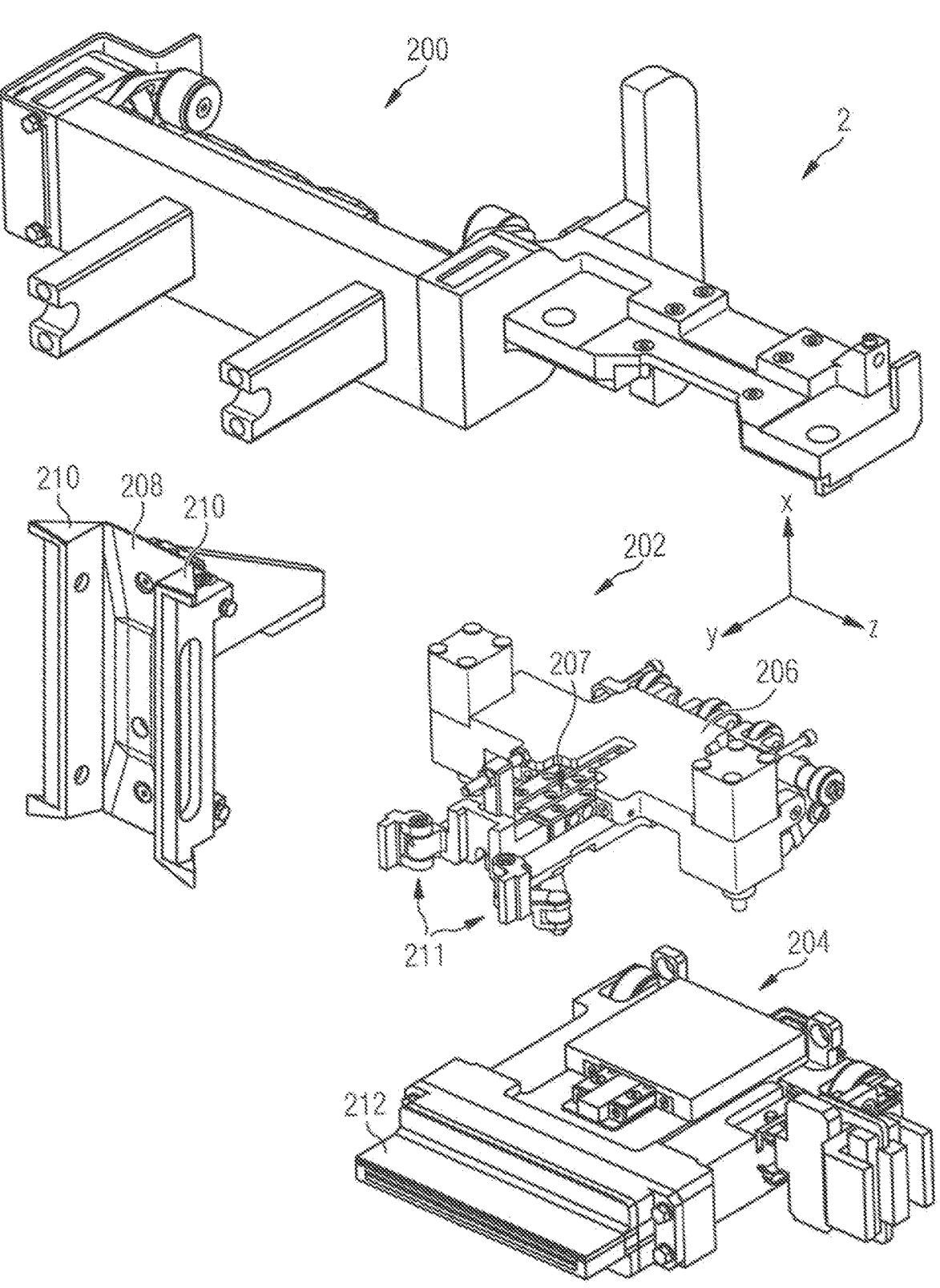
FIG. 2 is a non-limiting example of an exploded perspective view, with parts removed for clarity, of a movable member of a packaging assembly.

FIG. 2 exemplifies a movable member 2 of known type used in a packaging assembly for forming and sealing packages and is an exploded perspective view, with parts removed for clarity, of a movable member of such packaging assembly. This type of movable member 2 is described herein for clarity and easiness of understanding, however the movable member 2 is not to be interpreted as limited thereto. The movable member 2 may comprise a body 200 configured to couple to the track 1. The body 200 may be configured to slide over the track 1 along direction X, exemplified in FIG. 2. A forming unit 202 and a sealing unit 204 may be coupled, e.g. directly, to the body 200. The forming unit 202 may comprise a main body 206 and a movable element 207 configured to move along a second direction Y, orthogonal to the first direction X. The movable element 207 may be configured to move relatively to the main body 206 of the forming unit 202. The forming unit 202 may comprise a half-shell comprising a back wall 208 and flaps 210, connected directly or indirectly to movable element 207 of the forming unit 202. The forming unit 202 may further comprise hinges 211, connected to the flaps 210. The flaps 210 may be configured to rotate along an axis parallel to the first direction X.

The forming unit 202 may be configured to move, along the first direction X, relatively with respect to the sealing unit 204.

The sealing unit 204 may comprise a sealer 212 and may be configured to move along the second direction Y with respect to the body 200.

In one or more embodiments, for non-limiting example, the first element 20 and the second element 21 may comprise:

the body 200 and the main body 207 of the forming unit 202, the movable element 207 and the main body 206 of the forming unit 202, the flaps 210 and the back wall 208, the main body 206 of the forming unit 202 and the sealing unit 204, the body 200 and the sealing unit 204.

The movable member 2 may comprise a plurality of movement detectors 22 and a plurality of respective first and second elements 20, 21 as previously discussed. Each movement detector 22 in the plurality of movement detectors 22 may be configured to detect movement of the respective first element 20 and/or the second element 21 in the plurality of first and second elements 20, 21. Each movement detector 22 may be configured to generate a respective movement signal M indicative of the movement of the respective monitored element 20, 21.

The second element 21 may be coupled e.g. directly to the first element 20 and configured to move relatively thereto. As depicted by the arrows in the non-limiting example of FIG. 1, the movements of the second element 21 may be linear, e.g. away or towards the first element, or angular, e.g. creating an angle with respect to the first element 20.

The one or more movement detectors 20 may be mounted at, e.g. on a surface of, the first or second element 20, 21.

In one or more embodiments, the one or more movement detectors 22 may comprise inertial sensors, e.g. MEMS accelerators such as Inertial Measurement Unit (IMU) comprising a 3D accelerometer and a 3D gyroscope with digital output. That is, the inertial sensor may comprise one or more motion sensors 220, such as (3D) accelerometers and/or one or more rotation sensors 222, such as (3D) gyroscopes as illustrated in FIG. 3.

The processing unit 5, 23 may calculate the movement of the movable member 2 by means of Inertial Navigation System (INS), calculating by dead reckoning a position, an orientation, and a velocity (direction and speed of movement) of the movable member 2 without the need for external references. By using the principles of strapdown inertial navigation, it is possible to monitor the relative motion (rotations and displacements) by integrating the sensors readings over the time.

For example, the motion sensor 220 may be calibrated with respect to an initial reference coordinate system that may define the predetermined initial position. The rotation sensor 222 may be configured to measure a signal indicative of angular motion. The processing unit 5, 23 may be configured to compensate the data collected by the motion sensors 200 by means of the data collected by the rotation sensor 222. This way, the position calculated as a function of the movement signal M can remain precise with respect to the initial reference coordination system.

For example, the processing unit 5, 23 may be configured to calculate the position of the movable member 2 and/or the one or more elements 20, 21 as a function of the movement signal M indicative of an acceleration and/or indicative of an angular velocity detected by the inertial sensor(s). Thanks to the inertial sensors being positioned at the first and second elements 20, 21, a precise control of the operation of the parts of the movable members 2 is possible. That is, the elements 20, 21 configured to move to perform e.g. forming and sealing of a package may be monitored. By means of the inertial sensors, errors in positioning of the elements 20, 21 can be detected.

In addition or in alternative, thanks to the inertial sensors, a precise position control of the movable member 2 along the track 1 is possible. This way, potential errors in positioning of the movable members 2 can be detected.

In other words, the movement detector 22 comprises a (3D) motion sensor 220 and a (3D) rotation sensor 222 and the processing unit 5, 23 may be configured to:
- receive a movement signal M comprising a first signal M1, indicative of an acceleration, from the motion sensor 220 and a second signal M2, indicative of an angular velocity, from the rotation sensor 222,
- calculate an acceleration as a function of the first signal M1,
- calculate an angular velocity as a function of the second signal M2, and
- calculate a position, an orientation and/or a velocity of the movable member 2 and/or of elements 20, 21 thereof as a function of the acceleration and angular velocity calculated.

These calculations are performed with respect to the predetermined initial position or the initial reference coordinate system.

FIG. 4 illustrates a flow chart of a method of calculating a position of a movable member 2 and/or elements 20, 21 thereof that may be performed by the processing unit 5, 23. It will be appreciated that the same calculations can be performed by the processing unit 23 of the movable members 2 and/or by the system control and/or processing unit 5.

The processing unit 5, 23 may be configured for, for a movement detector 22 configured to measure the movement of the first or second element 20, 21:

1000, receiving the movement signal M comprising the first signal M1 indicative of the (3D) acceleration of the first or second element 20, 21,

1002, receiving the movement signal M comprising the second signal M2 indicative of the (3D) angular velocity of the first or second element 20, 21,

1004, calculating an orientation of the first or second element 20, 21 as a function of the second signal M2 and an initial estimate of an attitude of the first or second element 20,

1006, calculating an acceleration of the first or second element 20 as a function of the first signal M1, the calculated orientation and, optionally, the initial reference coordinate system,

1008, calculating a gravity acceleration compensation as a function of the calculated orientation,

1010, summing the calculated acceleration and the gravity acceleration compensation, and

1012, calculating a position of the first or second element 20, 21 as a function of said sum and the predetermined initial position.

In one or more embodiments, in addition or in alternative to determining a position of the movable members 2 and/or elements 20, 21 thereof, the movement detector 22 may be configured to detect the vibration of the movable member 2, e.g. due to preload. That is, the movable members 2 are coupled to the track 1 at lateral ends and the sliding of the movable members 2 on the track 1 produces vibration, with such vibration that may be detected by the movement detector 2. The processing unit 5 and/or 23 may be configured to receive the movement signal M indicative of a vibration measurement and calculate a response to vibration, over frequency, of the movable member 2 as a function of said movement signal M. The movement signal M may preferably comprise an acceleration.

In one or more embodiments, the movable member 2 may comprise a plurality of movement detectors 22 comprising a motion sensor 220 and positioned spaced from one another on an element 20, 21 of the movable member 2, as exemplified in FIG. 5. In other words, the motion sensors 220 may be positioned at different positions on the same element 20, 21, e.g. at opposite lateral extremities thereof.

The processing unit 5, 23 may be configured to:
- receive the movement signals M from the plurality of movement detectors 22, the signals M indicative of respective accelerations of the element at their position, and
- check whether said movement signals M differ from each other e.g. of more than a predetermined quantity. This may be done by checking whether the accelerations or whether other metrics based on the accelerations, e.g. some indicator in the frequency spectrum, differ (over time) of more than a predetermined quantity, e.g. indicative of a correct coupling of the movable member 2 to the track 1.

If such response fails to correspond to a predetermined frequency response pattern, the processing unit 5, 23 may be configured to interrupt operation of one or more of the movable members 2 and/or transmit the alert signal to the user interface.

That is, by detecting a difference in the accelerations, a potential tilting of the movable members 2 sliding on the track 1 can be detected, insofar as one side of the movable member 2 would have different acceleration, velocity and/or position with respect to the other side. Accordingly, a precise control is possible of the stability of the connection between the movable member 2 and the track 1. This way, potential errors in positioning of the movable members 2 can be detected.

The one or more movement detectors 22 may be potted with epoxy resin and fixed to the movable member 2. Optionally, the movement detectors 22 may be fixed to the first and/or second element 20, 21. Advantageously, this way the inertial sensors may become virtually water and shock proof.

The motion sensors 220 and the rotation sensors 222 may be calibrated before use, e.g. after installation on the linear motor system. The calibration may comprise (e.g. performed by the processing unit 5, 23):

- a definition of an error model for sensors 220, 222, wherein calibration parameters of the error model are automatically computed,
- a sensor fusion algorithm (EKF) to minimize an integration drift, due to errors in the measurement of acceleration and angular velocity that progressively worsen through integration to obtain the velocity, and a further integration to obtain the position.

To minimize the integration drift, the linear motor system may comprise a synchronization device configured to transmit a synchronization signal at each cycle, as better described in the following. This way a spatial reference is provided to the movable member. Through the synchronization signal the predetermined initial position may be updated.

In one or more embodiments, in addition or in alternative to the inertial sensors, as illustrated in FIG. 6, the movement detector 22 may comprise one or more magnets 226, positioned at one of the first or second element 20, 21, and one or more magnetometers 224, e.g. one or more Hall sensors or anisotropy magneto resistive (AMR) sensors, positioned at the other of the first or second element 20, 21. In the non-limiting example, the magnet 226 may be positioned on the second element 21, configured to move linearly along the illustrated arrow, and the magnetometers 224 are positioned at the first element 20. The movement signal M generated may be indicative of a magnetic field at the one or more magnetometer 224, with the magnetic field measured that changes as a function of the movement of the first and/or second element 20, 21. For example, the movement signal M may comprise a plurality of signals M3 received from the magnetometers 224 indicative of measurement of the magnetic field generated by the magnet 226, e.g. of the movement of the magnet 226.

The magnetometers 224 may be placed in an array. In one or more embodiments, as exemplified in FIG. 6, the magnetometers 224 may be positioned to form a cross-shape. Optionally, the centre of the cross may also comprise a magnetometer 224. The cross-shape disposition of the magnetometers 224 may have one or more advantages, e.g. to facilitate guaranteeing a good range in the motion detection while maintaining a low sensitivity on the cross directional alignment between the magnetometers and the magnet.

The motion detector 22 may comprise different types of magnetometers 224a, 224b which differ in terms of sensitivity. For example, the magnetometer 224a at the centre of the cross may have a higher sensitivity with respect to the remaining magnetometers 224b in the movement detector 22.

FIG. 7 depicts an example of sensitivity S of a conventional magnetometer 224, e.g. falling exponentially as a function of the distance d. The two curves represent an example of sensitivity for a magnetometer 224b having a lower sensitivity with respect to a magnetometer 224a having a higher sensitivity. As illustrated, the magnetometer 224b can measure differences in a magnetic field at higher distances d with respect the magnetometer 224a. In other words, the magnetometers 224b may be configured to detect the magnetic field in a first distance interval d1-d2, whereas the magnetometers 224a may be configured to detect the magnetic field in a second distance interval d3-d4. The higher distance of the second interval, i.e. d4, may be higher than the higher distance of the first interval, i.e. d2.

In one or more embodiments, the magnet 224 may be aligned with the magnetometer 224a positioned at the centre of the cross. The alignment may occur with respect to an axis X1 parallel to the direction of relative movement of the second element 21 with respect to the first element 20, herein exemplified as linear direction X.

The arrangement of the magnetometers as described above may have one or more advantages, e.g. even if the alignment of the magnet with respect to the magnetometers may change, this arrangement may at least partially compensate the errors deriving therefrom.

The magnetometers 224 and the magnets 226 may be positioned at surfaces of the first and second element 20, 21 facing towards one another. Preferably, the magnetometer 224 may be positioned at the first element 20 and the one or more magnets 226 may be positioned at the second element 21.

The magnetometer 224 may be coupled, e.g. directly, to the processing unit 23 of the movable member 2 and may be configured to send thereto the movement signal M comprising a third signal M3 indicative of a magnetic field at the magnetometer 224. The processing unit 5 and/or 23 may be configured to calculate the position of the second element 21 with respect to the first element 20 as a function of the movement signal M comprising the third signal M3.

The processing unit 5 and/or 23 may be configured to perform data fusion of the data of the one or more magnetometers 224, e.g. by integrating the data from each magnetometer. This is performed to produce consistent, accurate, and useful information than that provided by any individual magnetometer 224, e.g. better performances of the movable member and measuring range. Thanks to a magnetic model obtained from the plurality of magnetometers 224, the relative position may be determined with an error of +−0.1 mm for 30 mm.

The movable members 2 may comprise, in proximity with respect to the magnetometers, one or more temperature sensors (not illustrated). The processing unit 23 may be configured to receive a temperature from the temperature sensor and correct the data measured by the magnetometer 204 as a function of the temperature. For example, Hall sensors are sensitive to temperature and an improved detection may be obtained thanks to a temperature sensor if the linear motor system is placed in an environment subject to temperature fluctuations.

If the movement detector 22 comprises both the inertial sensors 220, 222 and the magnetometers and magnets 224, 226, the processing unit 5, 23 may be configured to calculate the position second element 21 with respect to the first element 20 as a function of the first, second and third signal M1, M2, M3.

In one or more embodiments the linear motor system comprises a powering device 4 couplable to the movable members 2 to provide power thereto. The powering device 4 may temporarily electrically couple to the movable member 2 at a predetermined powering region.

The powering device 4 may comprise an electrical pulse generator or a transformer, that can be temporarily and electrically coupled to the movable member 2. The electrical pulse generator or transformer may be used for sealing purposes. For example, the movable member 2 may be electrically coupled to a stationary powering device 4 while transiting at the powering region.

The movable members 2 may comprise each a powering module 24 configured to receive power from the powering device 4 and redistribute it to the electronic components in the movable member 2. For example, the power transfer consists of an electrical pulse from the powering device 4 to the powering module 24. The powering device 4 may be configured to electrically couple to the powering module 24 of the movable member 2 when the movable member 2 transitions by the powering device 4.

In one or more embodiment, as previously discussed and as exemplified in FIG. 8, the linear motor system may comprise a synchronization device 3 configured to transmit a synchronization signal S, e.g. at each cycle of the movable member 2. The movable members 2 may comprise a synchronization sensor 25, configured to detect the synchronization signal S. The synchronization sensor 25 may be coupled, e.g. directly, to the processing unit 23 configured to receive movement signal M from the movement detector 22. The movement signal M may be adjusted as a function of the synchronization signal S.

The processing unit 5 and/or 23 may thus be configured to calculate the movement of the movable members 2 and/or first element 20 and/or second element 21 also as a function of the synchronization signal S.

For example, the predetermined initial position of the movable member 2 on which the calculation of the position of the first and/or second element 20, 21 is based may be adjusted as a function of the synchronization signal S. For example, the initial position may be reset at the reception of the synchronization signal S.

The system control and/or processing unit 5 may be coupled, e.g. wirelessly, to the synchronization device 3. The system control and/or processing unit 5 may be configured to transmit an enable signal, indicative of a movable member 2 positioned at a predetermined synchronization region. The synchronization device 3 may be configured to transmit the synchronization signal S when said enable signal is received by the synchronization device 3.

The synchronization device 3 may comprise an optical transmitter, preferably an IR transmitter, configured to transmit an optical synchronization signal S, and the synchronization sensor 25 may comprise an optical sensor, preferably an IR receiver, configured to detect the optical synchronization signal S.

The optical sensor may be configured to detect an optical (IR) synchronization signal S that comprises a frequency modulated signal. The optical (IR) synchronization signal S may have a predetermined carrier frequency bandwidth, preferably between 20 and 50 kHz, more preferably 38 kHz. That is, the optical sensor may detect signals only in the predetermined bandwidth. Accordingly, the optical signal transmitter is configured to transmit the synchronization signal S in the predetermined carrier frequency bandwidth.

The synchronization device 3 may be positioned immediately upstream of the movable member 2 operating region, i.e. the handling region such as the forming and sealing region. Accordingly, the synchronization is performed immediately before the movable member 2 begins its designed automatized operation.

The synchronization device 3 may comprise, e.g. may consist of, the powering device 4. In this case, the synchronization sensor 25 is configured to detect the synchronization signal S indicative of the power transfer between the powering device 4 and the powering module 24.

Advantageously, thanks to the synchronization signal S, a drift effect in case of inertial sensors can be reduced.

Figure 9:
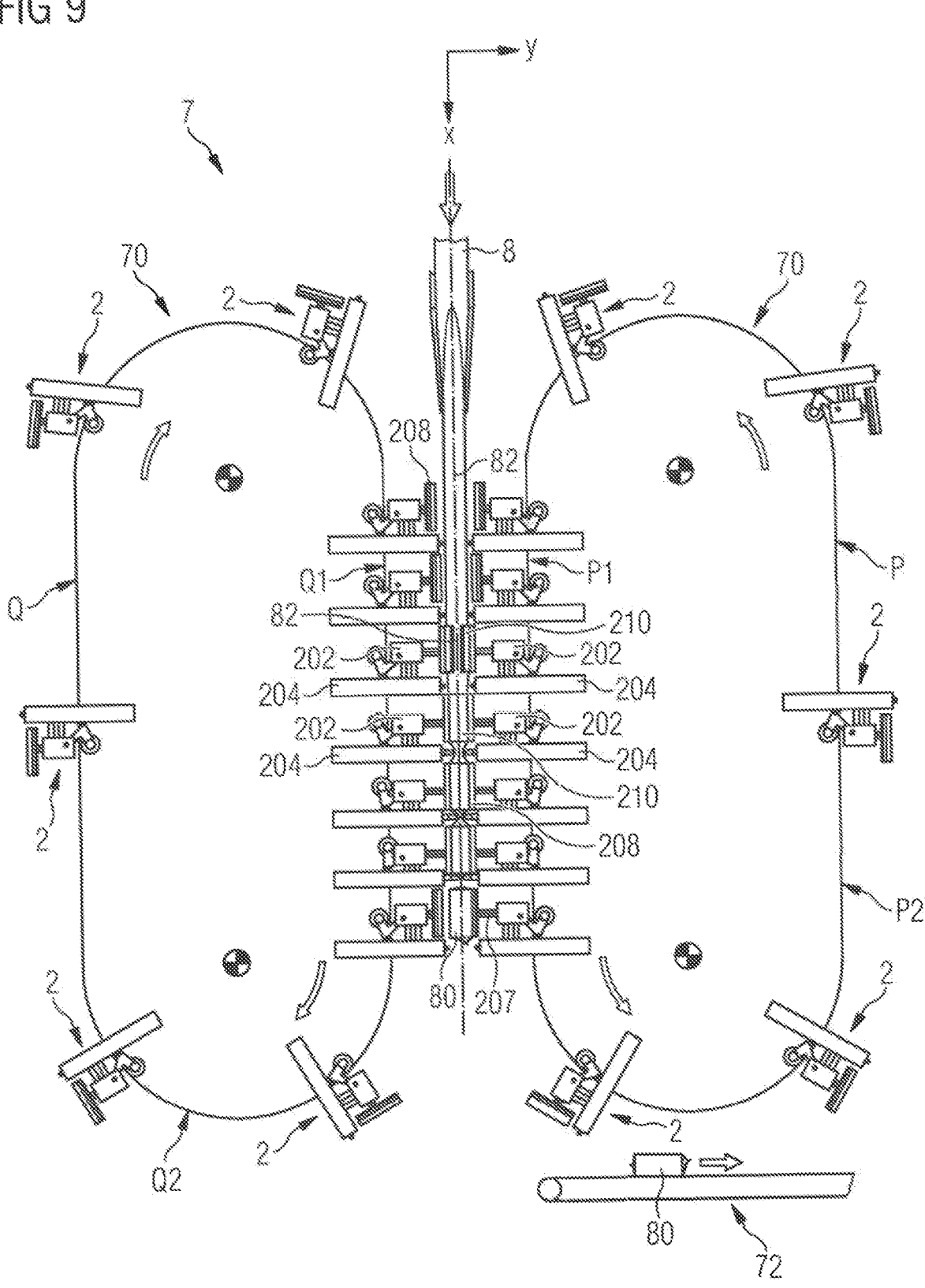

One or more embodiments, as illustrated in FIG. 9, refer to a forming assembly 7 configured to form one or more objects 80. In the following, a non-limiting example of a packaging assembly 7 is depicted, configured to form and seal a plurality of packs 80 containing a pourable product, preferably a pourable food product, starting from a tube 8 of packaging material. Whereas hereinafter reference is made to a packaging assembly 7, it will be appreciated that such is merely a non-limiting example for the ease of understanding and conciseness. Different types of forming assemblies 7 can exist that are not packaging assemblies. All features described in the following, even though related to a packaging assembly 7, can apply more in general to the forming assembly 7.

A tube 8 is formed in known manner by longitudinally folding and sealing a web (not shown) of packaging material. Tube 8 is then filled from above by a pipe (not shown) with the pourable product and is fed through packaging assembly 7 along a straight advancing direction X. In detail, tube 8 extends along a straight longitudinal, e.g. vertical, axis parallel to direction X.

The forming assembly 7, e.g. the packaging assembly 7, comprises a linear motor system according to one or more embodiments as described previously. Packaging assembly 1 comprises:

- a pair of conveyors 70 arranged on respective lateral sides of tube 8, spaced apart with respect to one another, and configured to cooperate with tube 8; and
- an outlet conveyor 72, which is arranged below conveyors 70 staggered with respect to axis X.

Each conveyor 70 substantially comprises the endless track 1 and a plurality of movable members 2, preferably movable members, coupled to, and cyclically movable along, one respective track 1. Each movable member 2 is configured to cyclically slide along track 1 of the respective conveyor 70. A plurality of movable members 2 slides, in use, along each track 1.

The forming assembly, e.g. the packaging assembly 7, thus comprises:

- a pair of endless tracks 1 between which the tube 8 is fed along the (e.g. straight) advancement direction X;
- a pair of movable members 2, each one of which movably coupled to, and cyclically movable along, one respective track 1.

Each movable member 2, e.g. as exemplified in the exploded view of FIG. 2 of the pair of movable members 2 comprises:

- a first element 20,
- a second element 21, relatively movable with respect to the first element 20,
- a respective forming unit 202 and optionally a respective sealing unit 204 linearly movable towards the tube 8, transversally to the advancement direction X, along direction Y, to cyclically cooperate in contact with successive tube portions 82, to form and optionally seal at least corresponding pack portions of respective packs 80, respectively, wherein at least one movable member 2 of the pair comprises one or more movement detectors 22 configured to transmit a movement signal M, e.g. indicative of movement of the at least one movable member 2, the first element 20 and/or the second element 21.

The forming assembly 7 further comprises a processing unit 5, 23 configured to calculate a movement of the movable member 2 and/or the first and/or second element 20, 21 as a function of the movement signal M received from the movement detector 22, e.g. a position of the movable member 2 with respect to the track 1 and/or a position of the second element 21 with respect to the first element 20. In addition or in alternative, the processing unit 5, 23 may be configured to calculate a vibration pattern of the movable member 2 as a function of the movement signal M, the vibration occurring while the movable member 2 is sliding over the track 1.

As illustrated in FIG. 9, the two tracks 1 define respective endless paths P, Q arranged on opposite sides of the tube 8. More specifically, paths P, Q comprise:

respective operative branches P1, Q1, preferably rectilinear, between which tube 8 is fed and along which movable members 2 cooperate with tube 8; and respective return branches P2, Q2, along which movable members 2 are detached from tube 8.

According to this preferred embodiment shown, paths P, Q are substantially oval-shaped.

In use, when sliding along the respective operative branch P1, Q1, each movable member 2 cooperates with a corresponding movable member 2—i.e. movable members 2 mutually cooperates two by two—defining in this way a pair of movable members 2 facing each other and cooperating with one another and with tube 8 while sliding along operative branches P1, Q1.

Each pair of movable members 2 is configured to cooperate with tube 8 to cyclically form and seal one respective pack 80 at a time, and cut the pack 80 to separate the pack 80 from tube 8, as shown in FIG. 4.

To this end, each movable member 2 comprises, at one of its sides, the forming unit 202 and the sealing unit 204 both configured to cooperate with tube 8 along the respective operative branches P1, Q1.

The forming units 202 are configured to respectively cooperate with tube portions 82 of tube 8 to form at least corresponding pack portions, more in particular corresponding packs 80. For this purpose, each forming unit 202 is carried by, preferably mounted on, the respective movable member 2 in a movable manner. The forming unit 202 may preferably comprise a half-shell, presenting a C-shaped cross section and comprising a back wall 208 and a pair of lateral flaps 210. In the embodiment shown, flaps 210 are movably coupled to wall 208. The flaps 210 project from opposite lateral edges of wall 208 when movable members move along operative branches P1, Q1, and are hinged to such edges.

In use, the half-shell of each forming unit 202 is configured to sequentially and cyclically cooperate in contact with tube portions 82 so as to form at least pack portions of respective packs 80.

Each half-shell is linearly movable transversally, e.g. orthogonally, to direction X, i.e. along direction Y, towards tube 8, i.e. towards the tube portion 82 that half-shell has to form. Each forming unit 202 comprises a movable element 207 linearly movable along direction Y, which carries a respective half shell.

Sealing units 204 are configured to cooperate with tube 8 to seal tube portions 82 at predetermined, equally spaced, successive cross sections crosswise to direction X. Furthermore, sealing units 204 are configured to cooperate with tube 8 to cut packs 80 at the cross sections, to separate packs 80 from one another.

On one side, each sealing unit 204 is mounted downstream of the corresponding forming unit 202 of the respective movable member 2 along the respective path P, Q and comprises a counter-sealing device and an extractable cutting element, for example a knife (not illustrated). On the other side, each sealing unit 204 is mounted downstream of the corresponding forming unit 202 of the respective movable member 2 along the respective path P, Q and comprises a sealing device and a seat, adapted to receive the knife of the corresponding sealing device configured to cooperate with such counter-sealing device. Sealing devices may comprise ultrasonic, induction or inductive heating sealing devices.

As shown in FIGS. 9, when forming units 202 and sealing units 204 are advanced by the respective movable members 2 along the respective operative branch P1, Q1, the respective half-shells, sealing devices and counter-sealing devices move back and forth along a direction Y between:

a closed position, or operative position, in which half-shells, sealing devices and counter-sealing devices cooperate with respective tube portions 82 to form, seal and cut respective packs 80; and an open position, or idle position, in which half-shells, sealing devices and counter-sealing devices are detached from tube 8 or from the formed packs 80.

When half-shells are in the operative (closed) position, flaps 210 of each half-shell rotate about the respective hinges, e.g. about an axis parallel to direction X, from a position in which they diverge from the respective wall 208, to a position in which they are substantially orthogonal to the wall 208, face flaps 210 of the other half-shell carried by the corresponding movable member 2 of the same pair and contact tube 8 to completely surround the respective tube portion 82 destined to form the respective pack 80. When two half-shells of two respective forming units 202 of a pair of cooperating movable members 2 are both in the operative (closed) position, they define a substantially prismatic cavity and accordingly control the volume and shape of one respective pack 80 being formed.

When the counter-sealing device and sealing device of a pair of cooperating movable members 2 are in the operative (closed) position, they cooperate with one another to heat-seal tube 8, so as to form a top sealing band and a bottom sealing band. Then, the respective cutting element is extracted, so as to cut packs 80 between the top and bottom sealing band of two adjacent packs 80 and separate formed packs 80 from one another.

As exemplified in FIG. 9, a further movement occurs along direction X, between the sealing unit 204 and the forming unit 202, to form a top and/or bottom of the packs 80.

The movement detectors 22 according to one or more embodiments may be positioned on the movable members 2 to monitor one or more of the aforementioned movements.

Accordingly, the first and/or the second element 21 may comprise the body 200 of the movable member 2, one or more components 206, 207, 208, 210 of the forming unit 202 and/or one or more components 204, 212 of the sealing unit 204. For example, the forming assembly 7 may comprise a plurality of movement detectors 22 configured to detect the movement of a plurality of first and/or second elements 20, 21. The plurality of first and/or second elements 20, 21 may be any combination of relatively movable parts of the movable member 2 as discussed.

For non-limiting example, it will be considered herein the monitoring of the vertical movement between the forming unit 202 and the sealing unit 204.

The movement detector 22 may comprise one or more inertial sensors 220, 222, optionally positioned at a surface of the main body 206 of the forming unit 202, potted in epoxy resin and fixed thereto. The inertial sensor(s) 220, 222 may be configured to detect the vertical acceleration due to the vertical movement of the forming unit 202 and calculate the position of the forming unit 202 with respect to the sealing unit 204, e.g. real-time, during the (entire) movement.

In addition or in alternative, the movement detector 22 may comprise one or more magnets 226, positioned at the main body 206 of the forming unit 202, and one or more magnetometers 224, e.g. Hall sensors, positioned at the sealing unit 204. For example, the magnetometers 224 and magnets 226 may be fixed on the respective forming and sealing unit 202, 204 at a surface facing the sealing and forming unit 204, 202, respectively.

The magnetometer(s) 224 may be configured to detect the change in magnetic field due to the vertical movement of the magnets 226 fixed on the forming unit 202 and calculate the position of the forming unit 202, e.g. real-time, during the (entire) movement. That is, it is possible to measure, with high accuracy, the motion profile of the forming unit 202 during the forming motion.

In one or more embodiments, to provide power to the movable members 2, the forming assembly 7, e.g. the packaging assembly, may comprise a powering device 4, e.g. an electrical pulse generator or a transformer, as described previously. The powering device 4 may be positioned at the track 1 and may be electrically couplable, e.g. temporarily, to the one or more movable members 2 to provide power thereto. The movable members 2 may be configured to electrically couple to the powering device 4 at a predetermined powering region.

Thanks to the present invention, it is possible to perform a non-contact measurement of the relative movements of the one or more elements 20, 21 of the movable members 2.

One or more embodiments may relate to a method of calculating a movement of a movable member 2 and/or a first and/or second element 20, 21 thereof. The method comprises:
  providing a linear motor system according to one or more embodiments as previously described,
  detecting a movement of the movable member 2, the first and/or second element 20, 21 by means of the one or more movement detectors 22,
  transmitting a movement signal M by means of the movement detector 22, and
  calculating a movement of the movable member 2, the first and/or second element 20, 21. The method may comprise calculating, as a function of the movement signal M:
  a position of the movable member (2) with respect to the track (1), and/or
  a position of the second element (21) with respect to the first element (20), and/or
  a vibration pattern of the movable member (2), the vibration pattern being indicative of a coupling of the movable member (2) to the track (1).

The method may comprise electrically coupling, e.g. temporarily, the powering device 4 to the at least one movable member 2 and providing power to the movable member 2.

The method may comprise, for a movement detector 22 mounted on the first or second element 20, 21:

calculating an acceleration and an angular velocity of the first or second element 21, as a function of the movement signal M, and
calculating the position of the first or second element 21 as a function of the acceleration and angular velocity calculated, e.g. measured and filtered.
The method may further comprise:
1000, receiving the movement signal M comprising a first signal M1 indicative of an acceleration of the first or second element 21,
1002, receiving the movement signal M comprising a second signal M2 indicative of an angular velocity of the first or second element 21,
1004, calculating an orientation of the first or second element 21 as a function of the second signal M2 and an initial estimate of an attitude of the first or second element 21,
1006, calculating an acceleration of the first or second element 21 as a function of the first signal M1, the calculated orientation and the initial reference coordinate system,
1008, calculating a gravity acceleration compensation as a function of the calculated orientation,
1010, summing the calculated acceleration and the gravity acceleration compensation, and
1012, calculating the position and/or a velocity of the first or second element 21 as a function of the sum and the predetermined initial position and/or a predetermined initial velocity.
The method may comprise:
receiving the movement signals M from a plurality of movement detectors 22 comprising motion sensor(s) 220 and positioned spaced from one another on the movable member 2,
calculating respective accelerations as a function of the movement signals M, and
check whether said movement signals M differ of more than a predetermined quantity e.g. in case of an acceleration if they differ of more than an acceleration threshold indicative of a fault of the movable member 2 in sliding along the track 1.
The method may comprise potting the movement detector 22 with epoxy resin and fixing the movement detector 22 to the movable member 2.
The method may comprise, in addition on in alternative to the inertial sensors:
positioning at least one magnet 226 at one of the first or second element 21,
positioning a magnetometer 224, preferably a Hall sensor, at the other of the first or second element 21,
calculate the position of said second element 21 with respect to the first element as a function of the movement signal M comprising the third signal M3 indicative of a change in magnetic field due to the movement of the magnets 226.
The method may comprise:
providing a synchronization device 3,
transmitting a synchronization signal S,
detecting the synchronization signal S by means of a synchronization sensor 25,
calculating the position of the movable member 2 with respect to the track 1 and/or the position of the second element 21 with respect to the first element also as a function of the synchronization signal S.
The method may comprise, e.g. at each cycle of a plurality of movable members 2 in the linear motor system or forming assembly:

transmitting the position and/or velocity and/or acceleration calculated, monitoring movement of the elements 20, 21 of the movable members, and/or identifying faults or errors as a function of the calculated position and/or velocity and/or acceleration.

If a fault or error is identified, the method may comprise generating an alarm signal indicative of the detected error, and/or interrupting operation of the movable members 2.

The invention claimed is:

1. A forming assembly configured to form a plurality of packages, the forming assembly comprising:

a pair of endless tracks;

a pair of movable members, each one of which movably coupled to, and cyclically movable along, one respective track;

each movable member of said pair of movable members comprising:

a coupling element, a second element, relatively movable with respect to the coupling element, a forming unit cyclically movable and configured to form the packages, wherein at least one movable member of the pair comprises at least one movement detector configured to transmit a movement signal, wherein the movement detector comprises at least one magnet positioned at one of the coupling element or the second element, and at least one magnetometer positioned at the other of the first coupling element or second element, and wherein the forming assembly comprises a processing unit configured to calculate a movement of the second element with respect to the coupling element as a function of the movement signal received from the movement detector.

2. The forming assembly of claim 1, comprising a packaging assembly configured to form and seal a plurality of packs containing a pourable product starting from a tube of packaging material, the packaging assembly comprising a pair of endless tracks between which said tube is fed along a straight advancement direction, and wherein each movable member of said pair of movable members comprises a respective forming unit and a respective sealing unit linearly movable towards said tube, transversally to said advancement direction, to cyclically cooperate in contact with successive tube portions, so as to form and seal at least corresponding pack portions of respective packs, respectively.

3. The forming assembly of claim 1, wherein the first coupling element and/or the second element comprise the body of the movable member, one or more components of the forming unit and/or one or more components of the sealing unit.

4. A linear motor system, comprising:

a track;

at least one movable member configured to move along said track, the at least one movable member comprising:

a coupling element for coupling the movable member to the track and, a second element, relatively movable with respect to the coupling element, and at least one movement detector configured to transmit a movement signal, wherein the movement detector comprises at least one magnet positioned at one of the coupling element or second element, and at least one magnetometer positioned at the other of the coupling element or the second element; and a processing unit, configured to calculate a movement of the second element with respect to the coupling element as a function of the movement signal received from the movement detector.

5. The linear motor system of claim 4, wherein the movement signal is indicative of a magnetic field at the at least one magnetometer, wherein the magnetic field detected changes as a function of the movement of the coupling element and/or second element.

6. The linear motor system of claim 4, whereby the at least one magnetometer is positioned at the coupling element and the at least one magnet is positioned at the second element.

7. The linear system according to claim 4, wherein the movement detector comprises a plurality of magnetometers.

8. The linear motor system of claim 7, wherein the magnetometers are positioned to form a cross-shape, preferably with the centre of the cross also comprising a magnetometer.

9. The linear motor system of claim 8, wherein the magnetometer at the centre of the cross has a higher sensitivity with respect to the remaining magnetometers in the movement detector.

10. The linear motor system or claim 8, wherein the at least one magnet is aligned with the magnetometer at the centre of the cross with respect to an axis parallel to a direction of relative movement of the second element with respect to the coupling element.

11. The linear motor system of claim 4, wherein the at least one magnetometer comprises a Hall sensor and/or an Anisotropic Magneto-Resistive sensor.

12. The linear motor system of claim 4, further comprising a synchronization device configured to transmit a synchronization signal, wherein the at least one movable member comprises a synchronization sensor, configured to detect the synchronization signal, and wherein the processing unit is configured to calculate the movement of the second element with respect to the coupling element also as a function of the synchronization signal.

13. The linear motor system of claim 12, wherein:

the synchronization device comprises an optical transmitter, preferably an IR transmitter, configured to transmit an optical synchronization signal, and the synchronization sensor comprises an optical sensor, preferably an IR receiver, configured to detect the optical synchronization signal; or the synchronization device comprises a powering device, configured to provide power to the at least one movable member, the at least one movable member comprises a powering module configured to receive power from the powering device, and the synchronization sensor is configured to detect the synchronization signal indicative of the power transfer between the powering device and the powering module.

14. The linear motor system of claim 4, wherein the at least one magnet and the at least one magnetometer are potted with epoxy resin and fixed to movable member.

15. A movable member couplable to a track, the movable member comprising:

a coupling element couplable to the track and configured to move along said track, a second element, relatively movable with respect to the coupling element, at least one movement detector configured to transmit a movement signal, wherein the movement detector comprises at least one magnet positioned at one of the coupling element or second element, and at least one magnetometer positioned at the other of the coupling element or the second element; and a processing unit, configured to calculate a movement of the second element with respect to the coupling element as a function of the movement signal received from the movement detector.

16. The movable member according to claim 15, wherein the processing unit is configured to calculate a position of the second element as a function of the movement signal.

17. The movable member according to claim 15, wherein the processing unit is configured to calculate a position of the second element with respect to the coupling element.

\* \* \* \* \*